(12) United States Patent
Haas et al.

(10) Patent No.: US 8,755,995 B2
(45) Date of Patent: Jun. 17, 2014

(54) METHOD AND DEVICE FOR UPDATING THE POSITION OF AN AIRCRAFT

(75) Inventors: Philippe Haas, Toulouse (FR); Stephane Dattler, Montlaur (FR); Julien Nico, Tournefeuille (FR)

(73) Assignee: Airbus Operations SAS, Tolouse (FR)

( * ) Notice: Subject to any disclaimer, the term of this patent is extended or adjusted under 35 U.S.C. 154(b) by 700 days.

(21) Appl. No.: 12/254,457

(22) Filed: Oct. 20, 2008

(65) Prior Publication Data

US 2009/0105951 A1 Apr. 23, 2009

(30) Foreign Application Priority Data

Oct. 23, 2007 (FR) ...................................... 07 07406

(51) Int. Cl.
*G01C 21/00* (2006.01)

(52) U.S. Cl.
USPC .......................................... 701/223; 701/411

(58) Field of Classification Search
CPC ....................... G01C 21/3415; G08G 1/096827
USPC ................................................ 701/223, 213
See application file for complete search history.

(56) References Cited

U.S. PATENT DOCUMENTS

| 4,168,524 A * | 9/1979 | Soltz et al. ..................... 701/223 |
| 2002/0198656 A1* | 12/2002 | Ford et al. ...................... 701/213 |
| 2004/0239560 A1 | 12/2004 | Coatantiec |
| 2006/0055596 A1* | 3/2006 | Bryant et al. ............. 342/357.06 |
| 2006/0167619 A1* | 7/2006 | Arethens ....................... 701/120 |

FOREIGN PATENT DOCUMENTS

FR 2 715 476 7/1995
WO 03/029755 4/2003

OTHER PUBLICATIONS

Preliminary Search Report dated Jul. 15, 2008 w/ English translation.

* cited by examiner

*Primary Examiner* — John Pauls
*Assistant Examiner* — Trang Nguyen
(74) *Attorney, Agent, or Firm* — Dickinson Wright PLLC

(57) ABSTRACT

The device (1) comprises a first system (3) which comprises means (14) for calculating the vector difference between a position generated by this first system (3) and a realignment position received from a second system (4), for one and the same date-stamping, and means (16) for adding this difference to any new position of the aircraft, generated by said first system (3), so as to obtain each time a realigned position.

7 Claims, 3 Drawing Sheets

METHOD AND DEVICE FOR UPDATING THE POSITION OF AN AIRCRAFT

Figure 1:
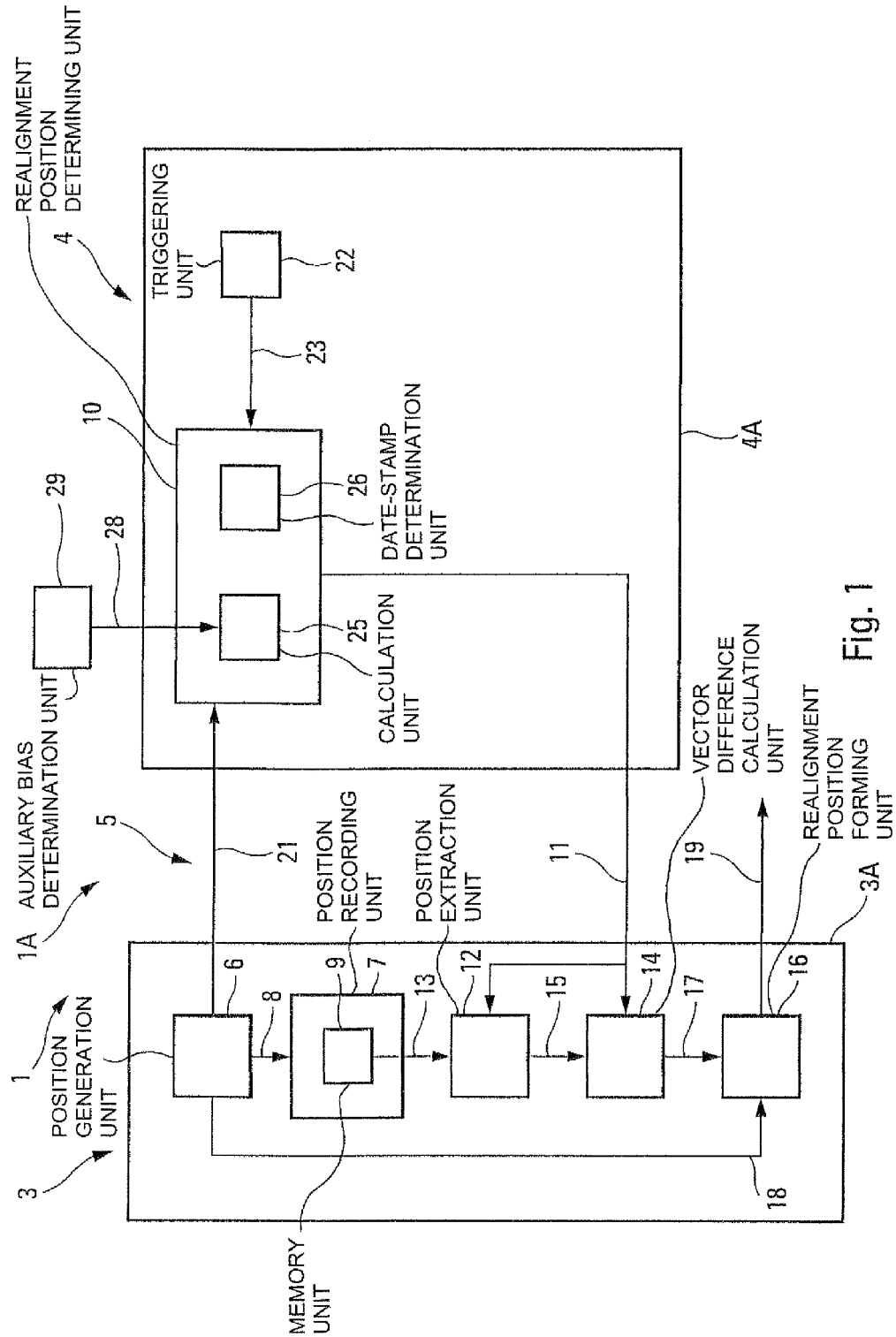

The present invention relates to a method and a device for realigning the position of an aircraft during a flight of the latter. More precisely, it applies to a realignment involving at least two different systems of the aircraft.

It is known that on civil airplanes, position realignment (exclusively by overflight) constitutes a backup solution when all the sensors, except the inertial sensors, are unusable (fault, reception problem, absence of radio means in the zone overflown, etc.) or few in number on slightly old airplanes, after an ocean flight for example (absence of ground radionavigation means). It is known that inertial sensors drift, and this may cause a position error of several nautical miles (NM) after a few hours of pure inertial flight (realignment generally being disabled when sensors other than inertial sensors are present).

In such a situation, realignment is generally done manually, by sight, by overflying a point which is known and which is recorded in a database of the airplane. Accordingly, the pilot of the airplane selects a known point from the onboard database with the aid of a man-machine interface means forming, for example, part of a navigation system of the aircraft, and presses on a corresponding key while overflying this point. The position is then realigned in the navigation system.

Nevertheless, because of the altitude of the airplane at the moment of realignment (generally several thousand meters), this realignment operation is rather imprecise and the architecture used is not optimal. Moreover, it is ineffectual to try to gain latency although the sighting error may be relatively significant. By way of example, for a sighting error of 10°, at 8000 meters altitude, the lateral position error is 1400 meters (about 0.76 NM).

So, the position error after a realignment is in general reinitialized to a fairly significant value (several NM), taking account at one and the same time of the angular uncertainty during realignment and of the error due to the system used. Such an error is judged minor for a civil airplane which will be able to recover at least radionavigation means on approach (fairly numerous VOR/DME devices around airports) and which will be able to benefit from the aid of the air traffic control.

On the other hand, the operational usage of a military airplane requires much better precision, all the more so since position realignments are more frequent. During such operational usage:
  certain sensors are no longer taken into account in an enemy zone, because of their possible jamming (ground radionavigation means) or their absence;
  moreover, satellite positioning systems, of GPS type ("Global Positioning System"), which are used on the airplane may be jammed or subjected to decoys, or more simply be deactivated by the crew so as to avoid such disturbances; and
  sensors, including a GPS sensor, may be masked during low-altitude flights, mainly in mountainous environments.

Moreover, with respect to civil airplanes, a much more significant position precision is demanded for a military airplane, since the quality of the position is paramount for certain operations such as a low-altitude flight in IMC conditions or a parachute drop for example.

Consequently, the aforesaid solution for realigning position which is used on civil airplanes is not suited to the military domain.

It will be noted that new military architectures for position calculation exist. Nevertheless, these architectures are complex. In particular for position calculation criticality reasons, the position generated by the navigation system (or computer) is not the only position source in the airplane. Certain computers such as the guidance computer will directly seek the position at the level of the position sensors. This situation makes it necessary to influence the existing realignment architecture, so as to also realign the position of certain position sensors.

Furthermore, in the civil domain, position realignment is, in general, carried out solely in the navigation system. The other user systems (for position) therefore always use positions which are output directly by the position sensors and which have therefore not been realigned.

The object of the present invention is to remedy the aforesaid drawbacks. It relates to a method which makes it possible to realign, in a particularly precise manner, the position of an aircraft, during a flight of the latter, which method involves at least two systems of the aircraft.

For this purpose, according to the invention, said method is noteworthy:
  in that the following successive steps are carried out:
    a) in a repetitive and automatic manner:
      a1) the position of the aircraft is generated;
      a2) the position thus generated is recorded in a memory, together with a date-stamping which is associated with this position and which represents the moment of generation of said position;
    b) a realignment position is determined, together with a realignment date-stamping which is associated with this realignment position;
    c) the position whose associated date-stamping corresponds to said realignment date-stamping is extracted from said memory;
    d) the vector difference between the position thus extracted and said realignment position is calculated, this vector difference representing a realignment bias; and
    e) this realignment bias is added to any new position of the aircraft so as to obtain each time a realigned position of said aircraft; and
  in that:
    steps a), c), d) and e) are carried out in at least one first system, for example an inertial system, which is on board the aircraft;
    step b) is carried out in a second system, for example a flight management system, which is also on board the aircraft; and
    said realignment position and said realignment date-stamping associated with it are transmitted from said second system to said first system.

Thus, by virtue of the invention, realignment is carried out in said first system so that any new position of the aircraft, generated by this first system, which may be used by any user system of the aircraft, is a realigned position.

Moreover, by virtue of the consideration of a realignment date-stamping which is used to extract the current position (which is generated at this moment), any error that might be related to the transmission of data, and in particular of the realignment position, between said first and second systems, is deleted since the same temporal reference (realignment date-stamping) is used to calculate the realignment position in the second system and the realignment bias in the first system, as specified below.

Thus, by virtue of the invention, a particularly precise realignment method is obtained, which can in particular be implemented in the military domain.

In a preferred embodiment, each of said steps a), c), d) and e) is carried out in a plurality of first systems of the aircraft. Moreover, said second system is connected to each of said first systems, and it transmits said realignment position and said associated realignment date-stamping to each of these first systems. Thus, each of these first systems generates (after the realignment) a position which is realigned, that is to say which is very precise.

Furthermore, in a first embodiment, in step b), said realignment position is calculated with the aid of a position generated in step a1) and of an auxiliary realignment bias, and said realignment date-stamping corresponds to the date-stamping which is associated with said position generated in step a1) and which is used to calculate the realignment position.

Additionally, in a second embodiment:
said realignment position corresponds to a particular geographical point of the terrestrial globe; and
said realignment date-stamping corresponds to the moment at which the aircraft overflies this particular geographical point (at which moment the pilot actuates appropriate realignment means).

The present invention also relates to a device for realigning the position of an aircraft during a flight of the latter, said device comprising at least one first system and one second system which are on board and which are connected together.

According to the invention, said realignment device is noteworthy in that:
said first system comprises:
first means for generating the position of the aircraft; and
second means for recording in a memory, preferably a circular buffer memory, the position thus generated, together with a date-stamping which is associated with this position and which represents the moment of generation of the latter;
said second system comprises calculation means for determining a realignment position, together with a realignment date-stamping which is associated with this realignment position;
said device comprises, moreover, data transmission means for transmitting said realignment position and said realignment date-stamping from said second system to said first system; and
said first system comprises moreover:
third means for extracting from said memory the position whose associated date-stamping corresponds to said realignment date-stamping received from said second system;
fourth means for calculating the vector difference between the position thus extracted and the realignment position received from said second system, this vector difference representing a realignment bias; and
fifth means for adding this realignment bias to any new position of the aircraft, generated by said first means, so as to obtain each time a realigned position of said aircraft.

In a preferred embodiment, said device comprises a plurality of first systems, and each of said first systems comprises first, second, third, fourth and fifth means such as aforesaid.

Furthermore, in a first embodiment:
said device comprises, moreover, means for transmitting to said second system the positions generated by said first means, together with the associated date-stampings;
said second system comprises triggering means able to be actuated by an operator to trigger a realignment of the position; and
said calculation means of said second system comprise:
an element for calculating said realignment position, by computing the sum of the current position of the aircraft at the moment at which the operator has actuated said triggering means and an auxiliary bias received; and
an element for determining, as realignment date-stamping, the date-stamping associated with said current position which is used to calculate the realignment position.

Additionally, in a second embodiment, said second system comprises:
means for generating and transmitting to said first system a target position which corresponds to a particular geographical point of the terrestrial globe and which represents the realignment position;
triggering means which are actuated by an operator at the moment at which the aircraft overflies said target position, to trigger a realignment of the position; and
means for transmitting to said first system the moment of actuation of said triggering means, which represents said realignment date-stamping.

Furthermore, advantageously, said first system comprises, moreover, means for transmitting the realigned position, generated by said fifth means, to at least one additional (user) system of the aircraft, for example a flight guidance system.

Thus, by virtue of the invention, this additional user system, whatever it be, always receives a realigned position, that is to say a very precise position.

The figures of the appended drawing will elucidate the manner in which the invention may be embodied. In these figures, identical references designate similar elements.

Figure 2:
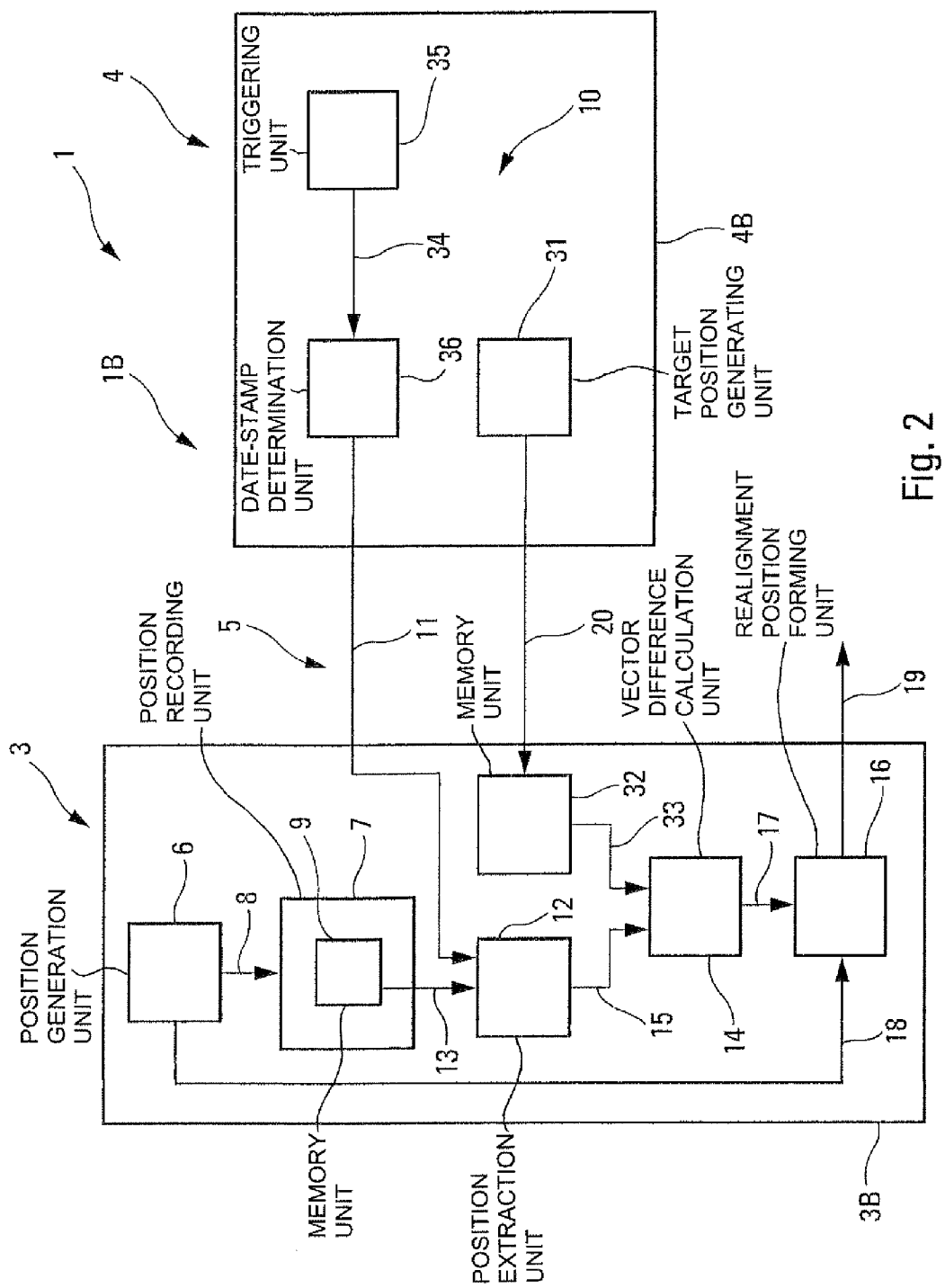

FIGS. 1 and 2 are the schematic diagrams of two different embodiments of a realignment device in accordance with the invention.

Figure 3:
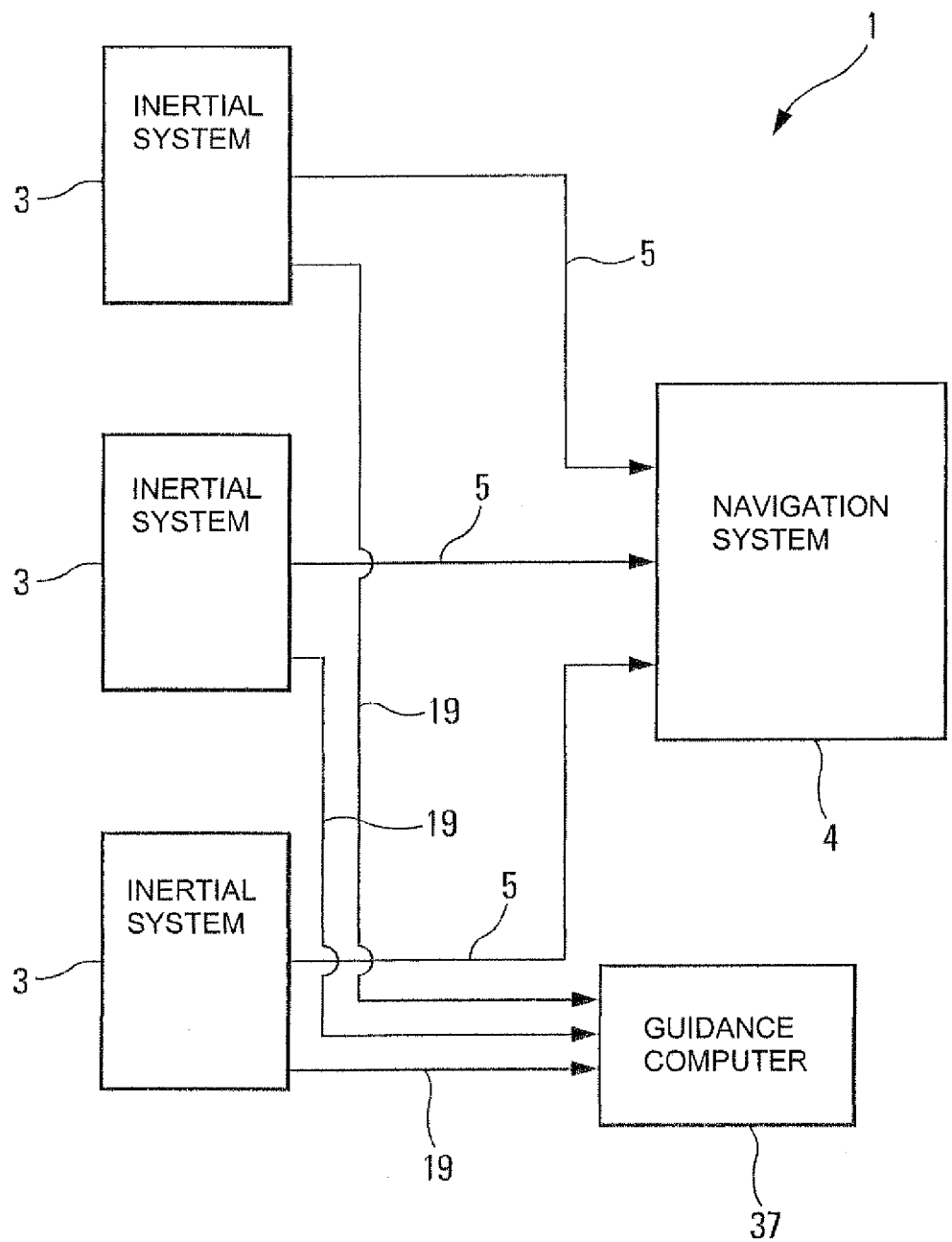

FIG. 3 schematically shows a realignment device in accordance with the invention in an embodiment comprising a plurality of position generating means.

The device 1 in accordance with the invention and schematically represented according to two different embodiments 1A and 1B, respectively in FIGS. 1 and 2, is intended to realign the position of an aircraft, in particular a transport airplane, during a flight of the latter. This device 1 comprises at least two different systems 3 and 4 which are connected together by data transmission means 5.

According to the invention:
said system 3 which represents for example an inertial system, in particular an air data inertial reference system of GADIRU type, comprises:
standard means 6 which generate, in a repetitive manner, the position of the aircraft; and
means 7 which are connected by way of a link 8 to said means 6 and which are formed so as to record in a memory 9, preferably a circular buffer memory, each position generated by said means 6, together with a date-stamping which is associated with this position (and which is also determined by the means 6). Within the framework of the present invention, a date-stamping represents the moment of generation (by the means 6) of the position, with which this date-stamping is associated;
said system 4 which represents, preferably, a navigation system, in particular a flight management system of FMS type, comprises means 10 for determining a realignment position, together with a realignment date-stamping which is associated with this realignment position;

said data transmission means 5 comprise at least one link 11, 20 making it possible to transmit said realignment position and said associated realignment date-stamping from said system 4 to said system 3; and said system 3 comprises moreover:

means 12 which are connected by way of a link 13 to said memory 9 and which are formed so as to extract, in a standard manner, from this memory 9 a previously recorded position, whose associated date-stamping corresponds to the realignment date-stamping received from said system 4 through the link 11, that is to say which has been generated at the moment defined by this realignment date-stamping;

means 14 which are formed so as to calculate the vector difference between the position extracted by said means 12 and received by way of a link 15 and the realignment position received from said system 4. This vector difference represents a realignment bias; and means 16 which are connected by way of a link 17 to said means 14 and which are formed so as to add the realignment bias (determined by said means 14) to any new position of the aircraft (generated by said means 6 and received by way of a link 18) so as to form each time a realigned position which can be transmitted to a user system (by way of a link 19).

Thus, by virtue of the invention, the realignment is carried out in said system 3 so that any new position of the aircraft, generated by the means 6 of this system 3, and able to be used by any user system of the aircraft, is a realigned position.

Moreover, by virtue of the consideration of a realignment date-stamping which is used to extract the current position (which is generated at this moment), any error that might be related to the transmission of data (and in particular of the realignment position), between said systems 3 and 4 is deleted since the same temporal reference (realignment date-stamping) is used to calculate the realignment position in the system 4 and the realignment bias in the system 3.

Thus, by virtue of the invention, a particularly precise realignment device 1 is obtained, which can in particular be implemented in the military domain.

Additionally, in the embodiment 1A represented in FIG. 1, the realignment device 1 is such that:

said systems 3 and 4 are embodied in the form of embodiments 3A and 4A;

said data transmission means 5 comprise, moreover, a link 21 which connects said means 6 of the system 3A to the means 10 of the system 4A so as to allow the system 3A to transmit to said system 4A the positions generated by the means 6, together with the associated date-stampings;

said system 4A comprises triggering means 22, for example a simple button, which are connected by way of a link 23 to said means 10 and which are able to be actuated by an operator, in particular the pilot of the aircraft, to trigger a realignment of the position; and said means 10 comprise:

a calculation element 25 for calculating said realignment position, by computing the sum of the current position of the aircraft (received from said means 6) at the moment at which the operator has actuated said triggering means 22 and of an auxiliary (realignment) bias specified below; and an element 26 for determining, as realignment date-stamping, the date-stamping which is associated with said current position which is used (by the calculation element 25) to calculate the realignment position. This realignment date-stamping therefore corresponds to the moment of actuation of the triggering means 22.

Said auxiliary bias, used by the calculation element 25, can either be determined directly by appropriate means of said system 4A, or be received, by way of a link 28, from a standard system 29, in particular a radar, which is able to determine an auxiliary bias such as this.

In a particular embodiment, said auxiliary (realignment) bias which illustrates a position error of the aircraft, is determined in the following manner:

if the update of the position is carried out by overflying a point, the bias is obtained by calculating the deviation between the position (stored in a database) of the point overflown and the current position of the aircraft during the overflight; and if the update of the position is carried out by radar, the bias corresponds to the deviation on the radar display between the position of the particular point seen by the radar and the position of this same point in the database.

The position realignment implemented by the realignment device 1 in accordance with said embodiment 1A therefore exhibits the following steps:

A/ the means 6 generate, in a repetitive manner, the current position of the aircraft. This current position is:

on the one hand, transmitted to said system 4A through the link 21; and on the other hand, recorded in the buffer memory 9, together with the associated date-stamping. This memory 9 is able to record several position/date-stamping pairs. When this memory 9 is full, the oldest pair is erased and is replaced with a new pair;

B/ after a realignment command carried out by the actuation of the triggering means 22 by an operator, in particular the pilot, the means 10 calculate the realignment position with the aid of the auxiliary bias, to which they add the current position of the aircraft at the moment of the actuation of said triggering means 22;

C/ a realignment date-stamping (corresponding to said moment of actuation of the triggering means 22) is associated with this realignment position, and this realignment position, together with said realignment date-stamping are transmitted by way of the link 11 respectively to said means 14 and 12;

D/ the means 14 calculate the realignment bias which will have to be applied to the positions generated by the means 6. Accordingly, said means 14 calculate the vector difference between the realignment position received from said means 4A and the position which has been generated at said realignment date-stamping by the means 6 (and extracted by the means 12). The fact of using the same temporal reference (realignment date-stamping) both for the position generated by the means 6 and for the realignment position, makes it possible to cancel any error that might be related to the transmission of data between the system 4A and the system 3A because of the nonzero duration of such a transmission; and E/ the means 16 add the realignment bias (which represents the current measurement error of the means 6) calculated by said means 14 to any new current position generated by the means 6, thereby making it possible to obtain a current position which is updated at source, that is to say in said position generating system 3A, in particular an inertial system.

Furthermore, it will be noted that:
the size of the buffer memory 9 must be sufficient to cover the latency between the calculation of the realignment position in the system 4A and its reception by the system 3A; and
the date-stamping can be absolute or based on a counter.

Furthermore, in the aforesaid step B/, it is assumed that the system 4A is able to correct the realignment position of the lag between the actuation of the triggering means 22 by the operator and the receipt of this order by the means 10 which determine the realignment position. If this lag is fixed, the position correction is directly dependent on the speed of the aircraft in the case of realignment by overflying a known geographical point. On the other hand, if this lag is not constant, the same principle as between the systems 3A and 4A can be applied between the means 10 and the triggering means 22. Another solution can consist in calculating the realignment position through a system further upstream, in particular a radar, optionally adapting the size of the buffer memory 9 so as to cover the lags of all the transmission chains.

Additionally, said second embodiment 1B represented in FIG. 2 is such that:
said systems 3 and 4 are embodied in the form of embodiments 3B and 4B;
the means 10 comprise means 31 allowing an operator to generate a target position which corresponds to a particular geographical point of the terrestrial globe and which represents the realignment position. Preferably, this target position is stored in an onboard database;
the data transmission means 5 comprise a link 20 for transmitting this target position to said system 3B;
said system 3B comprises a memory 32 which is connected by way of a link 33 to said means 14 and which is formed so as to record this target position (or realignment position) received through the link 20;
the system 4B comprises triggering means 35 which are actuated by an operator at the moment at which the aircraft overflies said target position to trigger a realignment of the position; and
the means 10 comprise, moreover, means 36 which are connected by way of a link 34 to said triggering means 35 and which determine the realignment date-stamping corresponding to the moment at which said triggering means 35 have been actuated. This realignment date-stamping is transmitted by way of the link 11 to said means 12.

This embodiment 1B is therefore implemented during a manual realignment of the position, which is triggered while overflying a particular geographicaly point.

It will be noted that the number of position/date-stamping pairs which can be recorded in the memory 9 depends on the latency between the calculation of a position and its use by the system 4B (for example a navigation system), on the latency between the receipt of the realignment command by the system 4B, its processing, then its dispatch and its reception by the system 3B. For example, if:
T1 seconds elapse between the calculation of a position and its reception in the system 4B;
T2 seconds elapse between the request for position realignment by the crew (actuation of the triggering means 35) and the receipt of this information by the means 36 of the system 4B;
T3 seconds are required by the system 4B to process the information and make it available; and
T4 seconds represent the duration of travel of the information until it is received by the system 3B,
the size of the buffer memory 9 must make it possible to record at least all the positions emitted over a duration D such that D=T1+T2+T3+T4, while taking the necessary margins if one of the times T1, T2, T3, T4 is known with a certain uncertainty. The realignment command takes T2 seconds to arrive in the system 4B. So, preferably, the system 4B deducts these T2 seconds from the time provided with the last position received. Consequently, if the duration T2 is known perfectly, the error due to the system is totally canceled.

The device 1 in accordance with the invention therefore makes it possible to realign the position at the source, that is to say at the level of the system 3 which generates a current position of the aircraft, thereby allowing all the user systems to benefit from a realigned position. Accordingly, the device 1 uses a method of date-stamping position data and of recording position/date-stamping pairs in a buffer memory 9, so as to circumvent the errors related to the transmission lags between the two systems 3 and 4.

Additionally, in the particular embodiment of FIG. 3, the device 1 comprises a plurality of systems 3, in particular inertial systems, for example of GADIRU type. Each of said systems 3 is connected to one and the same system 4, for example a flight management system, and the previously described steps of the realignment method are implemented between each of said systems 3 and said system 4, whatever the embodiment of said systems 3 (embodiment 3A or 3B) and of said system 4 (4A or 4B). Thus, in this particular embodiment of FIG. 3, the position is realigned in each of the systems 3, that is to say at the level of each of the position generating sources.

This particular embodiment allows all the user systems and in particular a system 37 represented in FIG. 3, for example a guidance computer of FG ("Flight Guidance") type, to receive realigned positions, that is to say very precise positions of the aircraft.

This particular embodiment therefore makes it possible:
to cancel the error which is induced by the transmission of information from the system 4 to each of the systems 3; and
for all the systems 37 that make use of positions (generated by the systems 3) to benefit from position realignment.

The invention claimed is:
1. A method for realigning the position of an aircraft during flight, the aircraft having a first system for forming a realigned position and a second system which represents a navigation system, the method comprising the steps of:
a) in said first system:
a1) generating a position of the aircraft;
a2) recording in a memory the generated position, together with a date-stamping associated with the generated position and which represents a moment of generation of said position;
b1) actuating a triggering unit by an operator request for realignment, wherein a realignment position is determined by said navigation system, together with a realignment date-stamping associated with the realignment position that takes into account elapsed time between the actuation of said triggering unit and receipt of the realignment position and date-stamping by said navigation system, wherein the realignment date-stamping corresponds to the date-stamping associated with the generated position of the aircraft in said first system, and b2) transmitting said realignment position and said associated realignment date-stamping from said navigation system to said first system;

c) extracting from said memory in said first system, the generated position and an associated date-stamping corresponding to said realignment date-stamping;

d) calculating a vector difference between the extracted position and said realignment position in said first system, the vector difference representing a realignment bias; and e) adding the realignment bias, in said first system, to a new position of the aircraft, taking into account an auxiliary realignment bias, so as to obtain said realignment position of said aircraft, wherein:

each of said steps a), c), d) and e) is carried out in a plurality of first systems, with each first system generating the position of the aircraft, said second system is connected to each of said first systems, and said second system transmits said realignment position and said associated realignment date-stamping to each of the first systems, and said realignment position is obtained according to the realignment bias, in which the realignment bias represents the vector difference calculated for each corresponding first system, taking into account the auxiliary bias.

2. The method as claimed in claim 1, wherein an update is carried out by overflying a point, and wherein the auxiliary realignment bias is obtained by calculating a deviation between a position, stored in a database, of the overflown point and the current position of the aircraft while overflying the point.

3. The method as claimed in claim 1, wherein:

said realignment position corresponds to a particular geographical point; and said realignment date-stamping corresponds to a moment at which the aircraft overflies the geographical point.

4. A method for realigning the position of an aircraft during flight, the aircraft having a first system for forming a realigned position and a second system which represents a navigation system, the method comprising the steps of:

a) in said first system:

a1) generating a position of the aircraft;

a2) recording in a memory the generated position, together with a date-stamping associated with the generated position and which represents a moment of generation of said position;

b1) actuating a triggering unit by an operator request for realignment, wherein a realignment position is determined by said navigation system, together with a realignment date-stamping associated with the realignment position that takes into account elapsed time between the actuation of said triggering unit and receipt of the realignment position and date-stamping by said navigation system, wherein the realignment date-stamping corresponds to the date-stamping associated with the generated position in a2), and b2) transmitting said realignment position and said associated realignment date-stamping from said navigation system to said first system;

c) extracting from said memory in said first system, the generated position and an associated date-stamping corresponding to said realignment date-stamping;

d) calculating a vector difference between the extracted position and said realignment position in said first system, the vector difference representing a realignment bias; and e) adding the realignment bias, in said first system, to a new position of the aircraft, taking into account an auxiliary realignment bias, so as to obtain said realignment position of said aircraft, wherein:

each of said steps a), c), d) and e) is carried out in a plurality of first systems, with each first system generating the position of the aircraft, said second system is connected to each of said first systems, and said second system transmits said realignment position and said associated realignment date-stamping to each of the first systems, said realignment position is obtained according to the realignment bias, in which the realignment bias represents the vector difference calculated for each corresponding first system, taking into account the auxiliary bias, and the auxiliary realignment bias corresponds to a deviation between a point seen by radar and a corresponding position, recorded in a database.

5. A device for realigning the position of an aircraft during flight, said device comprising:

a plurality of first onboard systems, for forming a realigned position, each of said first systems comprising:

position generating unit that generates a position of the aircraft; and memory unit that records in a memory the generated position, together with a date-stamping associated with the generated position and which represents a moment of generation of said position;

a second onboard system, which represents a navigation system and which comprises auxiliary bias determination system that determines, in response to an operator actuating a realignment request, an auxiliary bias for a realignment position, which includes a realignment date-stamping that takes into account elapsed time between the realignment request and receipt of the realignment request by said second system; and data transmission connection that transmits said realignment position and said realignment date-stamping from said second system to said first system;

wherein each of said first systems further comprises:

position extraction unit that extracts from said memory the position whose associated date-stamping corresponds to said realignment date-stamping received from said second system;

vector difference calculation unit that calculates a vector difference between the extracted position and the realignment position received from said second system, the vector difference representing a realignment bias; and realignment positioning unit that adds the realignment bias to a new position of the aircraft, generated by each said position generating unit, so as to obtain a realigned position of said aircraft, taking into account the auxiliary bias.

6. The device as claimed in claim 5, wherein:

said device comprises transmission link that transmits to said second system the position generated by said position generating unit, together with the associated date-stamping;

said second system comprises triggering means that is actuated by an operator to trigger a realignment of the position; and said auxiliary bias determination system comprises:
  a calculation unit that calculates said realignment position, by computing a sum of the current position of the aircraft at a moment at which the operator has actuated said triggering means and an auxiliary bias received; and
  a date stamp determination unit that determines for determining, as realignment date-stamping, a date-stamping associated with said current position which is used to calculate the realignment position.

7. The device as claimed in claim 5,
wherein said second system comprises:
target position generating and transmitting unit that generates and transmits to said first system a target position which corresponds to a particular geographical point and which represents the realignment position;
triggering unit that is actuated by an operator at a moment at which the aircraft overflies said target position, to trigger a realignment of the position; and
transmission link that transmits to said first system a moment of actuation of said triggering means, which represents said realignment date-stamping.

* * * * *